(12) United States Patent
Chen et al.

(10) Patent No.: US 12,135,110 B2
(45) Date of Patent: Nov. 5, 2024

(54) LARGE-DIP-ANGLE SELF-LEVELING DEVICE

(71) Applicant: Northwest Institute of Eco-Environment and Resources, Chinese Academy of Sciences, Lanzhou (CN)

(72) Inventors: Ji Chen, Lanzhou (CN); Youqian Liu, Lanzhou (CN); Haiming Dang, Lanzhou (CN); Jiexuan Kang, Lanzhou (CN); Shouhong Zhang, Lanzhou (CN); Jinchang Wang, Lanzhou (CN); Guilong Wu, Lanzhou (CN); Tianchun Dong, Lanzhou (CN); Zhiwei Wang, Lanzhou (CN); Yaojun Zhao, Lanzhou (CN)

(73) Assignee: Northwest Institute of Eco-Environment and Resources, Chinese Academy of Sciences, Lanzhou (CN)

( * ) Notice: Subject to any disclaimer, the term of this patent is extended or adjusted under 35 U.S.C. 154(b) by 459 days.

(21) Appl. No.: 17/712,843

(22) Filed: Apr. 4, 2022

(65) Prior Publication Data

US 2022/0356984 A1 Nov. 10, 2022

(30) Foreign Application Priority Data

May 6, 2021 (CN) .......................... 202110489408.X

(51) Int. Cl.
*G01C 15/12* (2006.01)
*F16M 11/22* (2006.01)
*G01C 9/26* (2006.01)

(52) U.S. Cl.
CPC .............. *F16M 11/22* (2013.01); *G01C 9/26* (2013.01); *G01C 15/12* (2013.01)

(58) Field of Classification Search
CPC ... G01C 9/02; G01C 9/26; G01C 9/12; G01C 9/16; G01C 15/10; G01C 15/12
See application file for complete search history.

(56) References Cited

U.S. PATENT DOCUMENTS 4,069,591 A * 1/1978 McArthur ........... E21B 47/0236
33/312
4,302,962 A * 12/1981 Williams ............... G01C 25/00
248/188.4

(Continued)

*Primary Examiner* — George B Bennett
(74) *Attorney, Agent, or Firm* — Hunton Andrews Kurth LLP

(57) ABSTRACT

A large-dip-angle self-leveling device is provided. The device comprises a mounting base platform arranged on a mounting stand column and a support cylinder connected with the mounting base platform. A leveling plate is arranged at the top of the mounting base platform, and a leveling platform is arranged on the leveling plate. A spirit bubble indicator and a control circuit board are arranged on the leveling platform. A connecting rod of balance weight is arranged in the support cylinder, one end of the connecting rod of balance weight is connected with the leveling platform, and the other end is connected with a balance weight. A four-core cable penetrates through the connecting rod of balance weight and the balance weight. Observation windows are symmetrically arranged at the lower part of the support cylinder. A melting pool is arranged at the bottom in the support cylinder.

15 Claims, 6 Drawing Sheets

(56) References Cited

U.S. PATENT DOCUMENTS

| | | | | |
|---|---|---|---|---|
| 4,517,835 A * | 5/1985 | Kerzner | ............... | E21B 47/026 |
| | | | | 73/152.02 |
| 5,752,320 A * | 5/1998 | Otte | ................... | E21B 47/0236 |
| | | | | 33/304 |
| 6,516,526 B1 * | 2/2003 | Iden | ...................... | G01C 17/10 |
| | | | | 33/355 R |
| 6,935,035 B2 * | 8/2005 | Smith | ..................... | G01C 9/12 |
| | | | | 33/DIG. 1 |
| 7,913,407 B1 * | 3/2011 | Finley | .................... | G01C 9/12 |
| | | | | 33/391 |
| 9,625,259 B2 * | 4/2017 | Ryoo | ................... | G01C 17/18 |
| 10,459,109 B2 * | 10/2019 | Fan | .......................... | G01V 3/28 |
| 11,199,403 B2 * | 12/2021 | Kirby | ..................... | G01C 9/26 |
| 11,332,903 B1 * | 5/2022 | Lu | ...................... | E02B 17/0818 |
| 2024/0168197 A1 * | 5/2024 | Zheng | .................... | G01W 1/08 |

\* cited by examiner

LARGE-DIP-ANGLE SELF-LEVELING DEVICE

CROSS REFERENCE TO RELATED APPLICATION

This patent application claims the benefit and priority of Chinese Patent Application No. 202110489408.X filed on May 6, 2021, the disclosure of which is incorporated by reference herein in its entirety as part of the present application.

TECHNICAL FIELD

The disclosure relates to a leveling device, in particular to a large-dip-angle self-leveling device.

BACKGROUND ART

The average altitude of the Qinghai-Tibet plateau is more than 4000 meters, the annual average temperature of the plateau hinterland is below 0° C., the natural geography and climate conditions are severe, and the engineering geological conditions are complicated. The construction of a transport hub from Qinghai to Lhasa is a lifeline project connecting inland and Tibet. The roadbed settlement deformation is an important index for evaluating the stability of the Qinghai-Tibet highway and railway engineering. In the past, the monitoring by a manual level gauge is used as the most basic monitoring means for monitoring field deformation, is also the most reliable at the present stage, and is also the most costly. With the improvement of technology, deformation monitoring also steps towards the direction of automated monitoring.

In order to ensure the precision of the monitoring data of the equipment, the horizontal state of the equipment needs to be kept in the working process of the automatic settlement deformation monitoring equipment. However, the equipment mounting stand column will be tilted due to various factors under natural environment, and for this reason, a large-dip-angle automatic leveling device is designed.

SUMMARY

The present disclosure aims to provide a large-dip-angle self-leveling device with low cost, wide application range and high leveling reliability.

In order to solve the problems, the present disclosure provides a large-dip-angle self-leveling device, the device comprises a mounting base platform arranged on a mounting stand column and a support cylinder connected with the mounting base platform; a leveling plate is arranged at atop of the mounting base platform, and a leveling platform for mounting instruments is arranged on the leveling plate; a spirit bubble indicator and a control circuit board are arranged on the leveling platform; a connecting rod of balance weight is arranged in the support cylinder, one end of the balance weight connecting rod of balance weight is connected with the leveling platform, and the other end of the connecting rod of the balance weight is connected with a balance weight; a four-core cable penetrates through the connecting rod of balance weight and the balance weight; observation windows are symmetrically arranged at the lower part of the support cylinder; a melting pool is arranged at the bottom in the support cylinder, and dedicated hot melt adhesive is contained in the melting pool; a heating pipe is inserted into the dedicated hot melt adhesive and is connected with the balance weight through a heat insulation sleeve made of epoxy resin; one end of the four-core cable is connected with the control circuit board, and an other end is connected with the heating pipe.

Bottom of the mounting base platform is connected with the support cylinder through a connecting flange of the support cylinder.

The mounting base platform is connected with the leveling plate, and the leveling plate is connected with the leveling platform, respectively through four groups of leveling jackscrews respectively in a symmetrical distribution mode.

Each of the leveling jackscrews comprises a pointed jackscrew arranged on the leveling platform and a concave jackscrew arranged on the leveling plate; the pointed jackscrew is connected with the concave jackscrew.

The pointed jackscrew is connected with the leveling platform, and the concave jackscrew is connected with the leveling plate, respectively through a fixing nut.

The connecting rod of balance weight and the leveling platform are screwed up through threads.

The lower end of the connecting rod of balance weight is provided with two grooves, and the balance weight is provided with threaded holes which are located in correspondence to the grooves on the connecting rod; the balance weight is tightened against the connecting rod of balance weight by means of six balance adjusting jackscrews (9) passing through the threaded holes which are symmetrically distributed in two layers.

Six openings are formed in the support cylinder, which are located in correspondence to the balance adjusting jackscrew.

The connecting rod of balance weight and the balance weight are both hollow, and the four-core cable penetrates through the connecting rod of balance weight and the balance weight.

The heating pipe and the balance weight are respectively connected with the heat insulation sleeve made of epoxy resin through a fixing screw of the heat insulation sleeve.

The melting pool is connected with the support cylinder through a fixing screw of the melting pool.

A positive pole and a negative pole of the heating pipe are connected with the control circuit board via the four-core cable through the threaded hole on the outer wall of the heating pipe.

The melting pool is provided with a leveling limiting ring, and the leveling limiting ring is provided with a limiting connecting sheet connected with the four-core cable.

The dedicated hot melt adhesive is prepared by mixing paraffin, rosin and hot melt adhesive stick according to a mass ratio of 1:1:1, and then heating to melt and uniformly stirring the paraffin, rosin and hot melt adhesive stick.

A heating end of the heating pipe is inserted into the dedicated hot melt adhesive in the melting pool.

Compared with the prior art, the present disclosure has the following advantages:

1. The present disclosure is provided with a balance weight to achieve automatic leveling of the instrument mounting platform under only the gravity of the counterweight, without an external force.
2. The present disclosure is provided with a leveling jackscrew, and the connection mode of the jackscrew realizes the automatic leveling of the leveling platform in a non-locked state (where the hot melt adhesive is melted) under the gravity of the counterweight.
3. The present disclosure is provided with a balance adjusting jackscrew, and the leveling platform in a non-locking state can be kept horizontal by adjusting the balance adjusting jackscrew during installation and commissioning.
4. The present disclosure is provided with a control circuit board, and thus has an alarm function of over-limit leveling. When the mounting stand column is greatly inclined, the outer wall of the heating pipe is contacted with the limit ring to form a closed circuit through the cable, and an alarm is sent to an instrument control circuit in an electric signal form as soon as the control circuit board detects a circuit signal.
5. According to the present disclosure, the diameters of the support cylinder, the melting pool and the supporting facilities are selected according to requirements, so that self-leveling of different maximum dip-angle is realized. In practice, when the height of the support cylinder is 1 m and the diameter of the melting pool is 35 cm, the tested maximum dip-angle will be 8 degrees.
6. According to the present disclosure, the connecting rod of balance weight and the balance weight are both hollow, so that a cable can conveniently pass through the connecting rod of balance weight and the balance weight.
7. The equipment of the present disclosure is arranged on the leveling platform, and the leveling platform is provided with the control circuit board, so that the control circuit board and the equipment can share power supply and can communicate with each other.
8. The present disclosure has low cost and high leveling reliability, and is suitable for the installation of instrument that needs to maintain a horizontal state during the working process of a measuring instrument.

BRIEF DESCRIPTION OF THE DRAWINGS

The following further describes embodiments of the present disclosure in detail with reference to the accompanying drawings.

In the figures: 1—spirit bubble indicator; 2—leveling platform; 3—leveling jackscrew; 31—pointed jackscrew; 32—fixing nut; 33—concave jackscrew; 4—leveling plate; 5—mounting base platform; 6—connecting flange of the support cylinder; 7—support cylinder; 71—opening; 72—observation window; 8—connecting rod of balance weight; 9—balance adjusting jackscrew; 10—balance weight; 11—fixing screw of the heat insulation sleeve; 12—heat insulation sleeve made of epoxy resin; 13—heating pipe; 14—melting pool; 15—fixing screw of the melting pool; 16—leveling limiting ring; 17—limiting connecting sheet; 18—control circuit board; 19—four-core cable; and 20—mounting stand column.

DETAILED DESCRIPTION OF THE EMBODIMENTS

Figure 1:
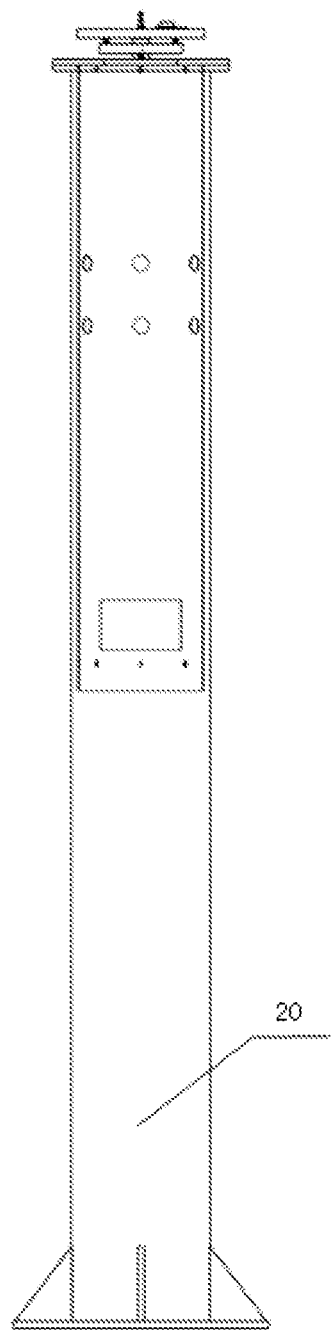
FIG. 1 is a view of the present disclosure in an installation state.
Figure 2:
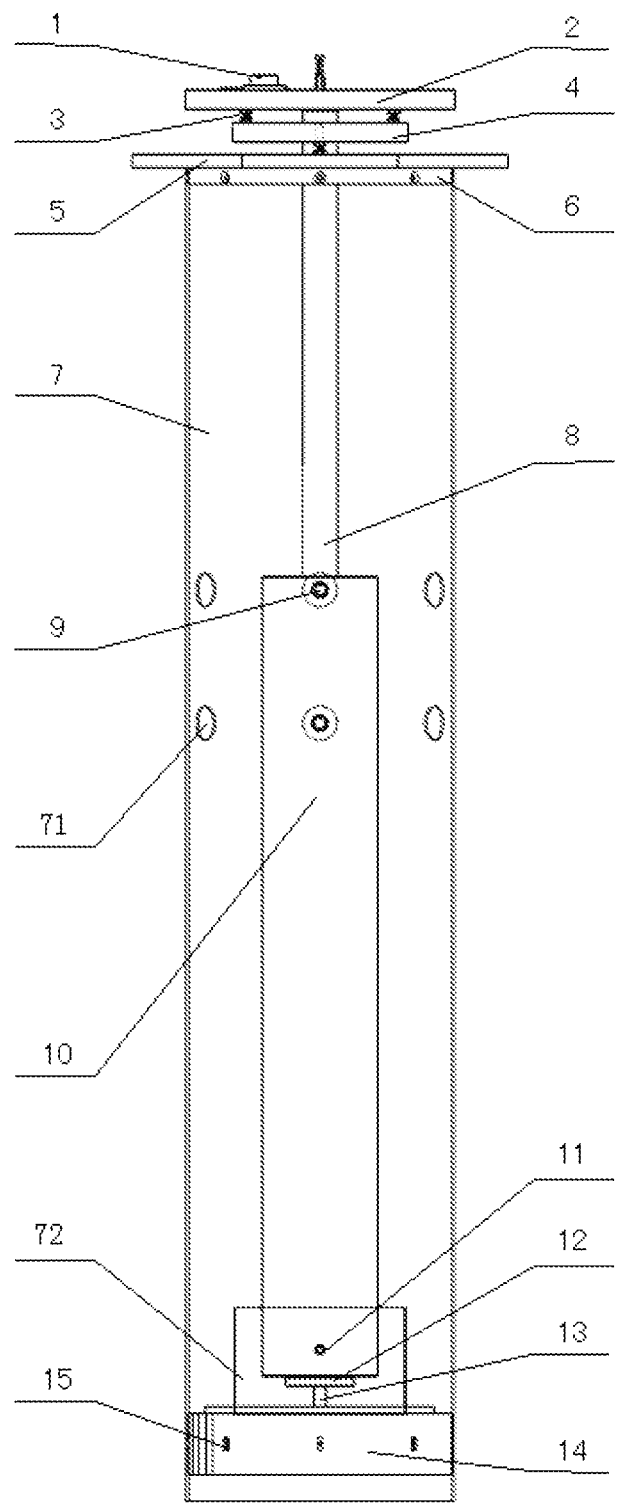
FIG. 2 is a side view of the main body of the present disclosure.
Figure 3:
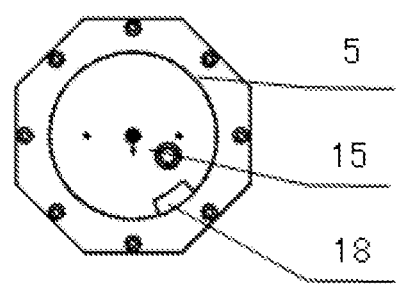
FIG. 3 is a top view of the present disclosure.
Figure 4:
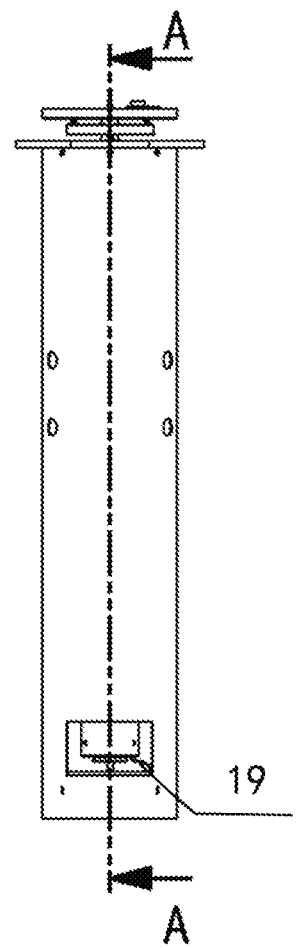
FIG. 4 is a view of the present disclosure in detail.
Figure 5:
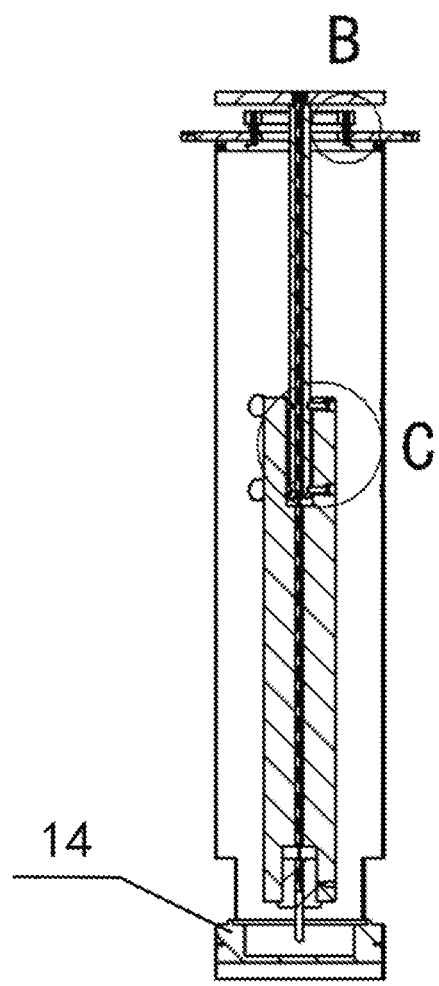
FIG. 5 is a sectional view taken along line A-A of the present disclosure.
Figure 6:
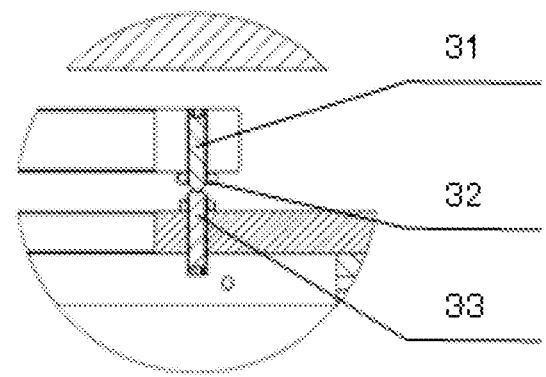
FIG. 6 is an enlarged view of portion B of the present disclosure.
Figure 7:
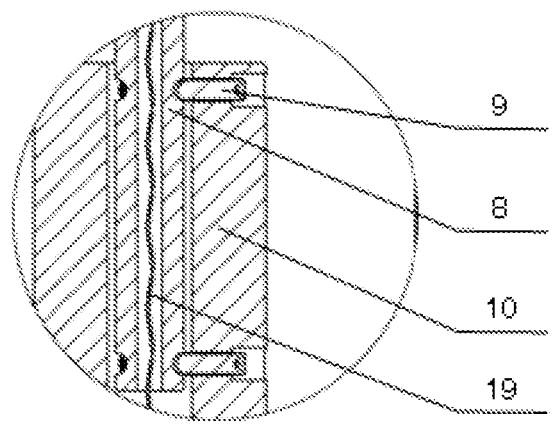
FIG. 7 is an enlarged view of portion C of the present disclosure.
Figure 8:
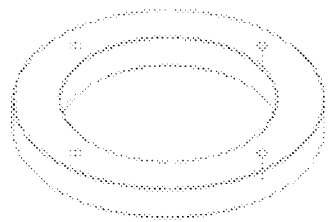
FIG. 8 is a schematic view of the leveling plate of the present disclosure.
Figure 9:
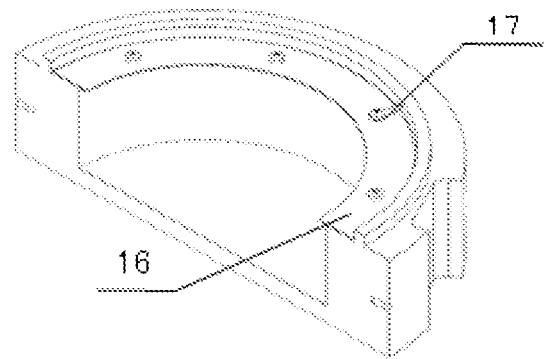
FIG. 9 is a schematic view of a melting pool of the present disclosure.
Figure 10:
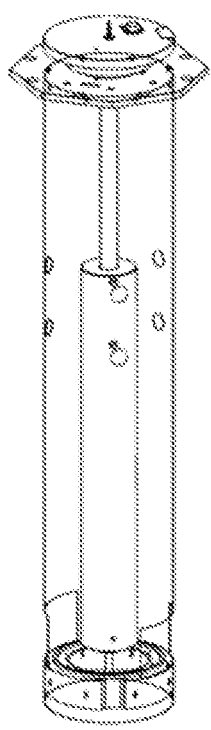
FIG. 10 is an isometric view of the present disclosure.

As shown in FIGS. 1 to 10, the large-dip-angle self-leveling device comprises a mounting base platform 5 arranged on a mounting stand column 20 and a support cylinder 7 connected with the mounting base platform 5.

A leveling plate 4 is arranged at the top of the mounting base platform 5 and a leveling platform 2 for mounting instruments is arranged on the leveling plate 4; a spirit bubble indicator 1 and a control circuit board 18 are arranged on the leveling platform 2, and the installation position is adjusted according to the actual use. The leveling platform 2 is provided with hole sites for facilitating installation of instruments, and the control circuit board 18 and the instruments share power supply and can communicate with each other.

A connecting rod 8 of a balance weight is arranged in the support cylinder 7, one end of the connecting rod 8 of the balance weight is connected with the leveling platform 2, and the other end is connected with the balance weight 10; a four-core cable 19 penetrates through the connecting rod 8 of the balance weight and the balance weight 10; observation windows 72 are symmetrically arranged at a lower part of the support cylinder; a melting pool 14 is arranged at the bottom in the support cylinder 7, and dedicated hot melt adhesive is contained in the melting pool 14; a heating pipe 13 is inserted in the dedicated hot melt adhesive, and the heating pipe 13 is connected with the balance weight 10 through an heat insulation sleeve made of epoxy resin 12; one end of the four-core cable 19 is connected with the control circuit board 18, and the other end is connected with the heating pipe 13.

Wherein: the bottom of the mounting base platform 5 is connected with a support cylinder 7 through a connecting flange 6 of the support cylinder.

The mounting base platform 5 is connected with the leveling plate 4, and the leveling plate 4 is connected with the leveling platform 2, respectively through four groups of leveling jackscrews 3 symmetrically distributed, so that the leveling platform 2 forms a free swing structure.

Each of the leveling jackscrews 3 comprises a pointed jackscrew 31 arranged on the leveling platform 2 and a concave jackscrew 33 arranged on the leveling plate 4; the pointed jackscrew 31 is connected with the concave jackscrew 33. The pointed jackscrew 31 is connected with the leveling platform 2, and the concave jackscrew 33 is connected with the leveling plate 4, respectively through a fixing nut 32.

The connecting rod 8 of the balance weight and the leveling platform 2 are screwed up through threads.

The lower end of the connecting rod 8 of the balance weight is provided with two grooves, and the balance weight 10 is provided with threaded holes which are located in correspondence to the grooves on the connecting rod 8; the balance weight 10 is tightened against the connecting rod 8 of the balance weight by means of six balance adjusting jackscrews 9 passing through the threaded holes which are symmetrically distributed in two layers. The leveling platform 2 can reach the level of a free state by adjusting the tightness of each balance adjusting jackscrew 9.

Six openings 71 are formed in the support cylinder 7, which are located in correspondence to the balance adjusting jackscrew 9 to facilitate the adjustment of the balance weight 10.

The connecting rod 8 of the balance weight and the balance weight 10 are both hollow, and a four-core cable 19 penetrates through the connecting rod of the balance weight and the balance weight 10.

The heating pipe 13 and the balance weight 10 are respectively connected with a heat insulation sleeve made of epoxy resin 12 through a fixing screw 11 of the heat insulation sleeve.

The melting pool 14 is connected to the support cylinder 7 through a fixing screws 15 of the melting pool.

The positive electrode and negative electrode of the heating pipe 13 are connected with the control circuit board 18 via the four-core cable 19 through the threaded hole on the outer wall of the heating pipe.

The melting pool 14 is provided with a leveling limiting ring 16, and the leveling limiting ring 16 is provided with a limiting connecting sheet 17 connected with the four-core cable 19.

The dedicated hot melt adhesive is prepared by mixing paraffin, rosin and a hot melt adhesive stick according to the mass ratio of 1:1:1, then heating to melt and uniformly stirring the paraffin, rosin and hot melt adhesive stick, pouring the mixture into the melting pool 14, and finally cooling and solidifying the mixture. The hot melt adhesive stick adjusts the damping viscosity, and paraffin and rosin adjust the melting point of about 50±5° C.

The heating end of the heating pipe 13 is inserted into the dedicated hot melt adhesive in the melting pool 14.

The working principle is as follows:

in a general state, the hot melt adhesive is in a solidification state, the heating pipe 13 and the balance weight 10 are in a locked state, and the leveling platform 2 cannot swing freely. The instruments are required to communicate with the leveling control circuit board 18 before formal measurement is started, the hot melt adhesive is melted by controlling the heating of the heating pipe 13, and the leveling structure is further enabled to form a free swing state; the leveling platform 2 enters a horizontal state under the gravity of the balance weight 10; after heating is finished, the hot melt adhesive is waited to be cooled and the leveling structure is locked, the leveling platform 2 is in the horizontal state and reports that the leveling of the equipment is finished, the whole leveling process is completed, and the instruments can start formal measurement work after receiving complete information of leveling.

When the dip-angle of the mounting stand column 20 is large, the leveling system' work will generate an extreme state that the heating pipe 13 touches the leveling limiting ring 16; due to the outer wall of the heating pipe 13 and the leveling limiting ring 16 are connected with cables, a circuit is formed when they touch each other, the control circuit board 18 gives an alarm to prompt that the leveling exceeds the limit and needs to be maintained. In practice, the diameters of the melting pool 14, the matched mounting stand column 20 and the support cylinder 7 are adjusted and designed according to test conditions, so that the automatic leveling of a large-dip-angle can be realized.

What is claimed is:

1. A large-dip-angle self-leveling device, comprising a mounting base platform arranged on a mounting stand column and a support cylinder connected with the mounting base platform;

a leveling plate is arranged at atop of the mounting base platform, and the leveling plate is provided with a leveling platform for mounting instruments;

a spirit bubble indicator and a control circuit board are arranged on the leveling platform;

a connecting rod of a balance weight is arranged in the support cylinder, one end of the connecting rod of the balance weight is connected with the leveling platform, and an other end of the connecting rod of the balance weight is connected with the balance weight;

a four-core cable penetrates through the connecting rod of the balance weight and the balance weight;

observation windows are symmetrically arranged at a lower part of the support cylinder;

a melting pool is arranged at bottom in the support cylinder, dedicated hot melt adhesive is contained in the melting pool;

a heating pipe is inserted into the dedicated hot melt adhesive, and the heating pipe is connected with the balance weight through a heat insulation sleeve made of epoxy resin; and one end of the four-core cable is connected with the control circuit board, and an other end of the four-core cable is connected with the heating pipe.

2. The large-dip-angle self-leveling device according to claim 1, wherein, bottom of the mounting base platform is connected with the support cylinder through a connecting flange of the support cylinder.

3. The large-dip-angle self-leveling device according to claim 1, wherein, the mounting base platform is connected with the leveling plate, and the leveling plate is connected with the leveling platform, respectively through four groups of leveling jackscrews in a symmetrical distribution mode.

4. The large-dip-angle self-leveling device according to claim 3, wherein:

each of the leveling jackscrews comprises a pointed jackscrew arranged on the leveling platform and a concave jackscrew arranged on the leveling plate; and the pointed jackscrew is connected with the concave jackscrew.

5. The large-dip-angle self-leveling device according to claim 4, wherein, the pointed jackscrew is connected with the leveling platform, and the concave jackscrew is connected with the leveling plate, respectively through a fixing nut.

6. The large-dip-angle self-leveling device according to claim 1, wherein, the connecting rod of the balance weight and the leveling platform are screwed up through threads.

7. The large-dip-angle self-leveling device according to claim 1 wherein:

a lower end of the connecting rod of the balance weight is provided with two grooves, and the balance weight is provided with threaded holes which are located in correspondence to the two grooves on the connecting rod; and the balance weight is tightened against the connecting rod of the balance weight by means of six balance adjusting jackscrews passing through the threaded holes which are symmetrically distributed in two layers.

8. The large-dip-angle self-leveling device according to claim 7, wherein, six openings are formed in the support cylinder, which are located in correspondence to the balance adjusting jackscrew.

9. The large-dip-angle self-leveling device according to claim 1, wherein, the connecting rod of the balance weight and the balance weight are both hollow, and the four-core cable penetrates through the connecting rod the balance weight and the balance weight.

10. The large-dip-angle self-leveling device according to claim 1, wherein, the heating pipe and the balance weight are respectively connected with the heat insulation sleeve made of epoxy resin through a fixing screw of the heat insulation sleeve.

11. The large-dip-angle self-leveling device according to claim 1, wherein, the melting pool is connected with the support cylinder through a fixing screw of the melting pool.

12. The large-dip-angle self-leveling device according to claim 1, wherein, a positive electrode and a negative electrode of the heating pipe are connected with the control circuit board via the four-core cable through a threaded hole on an outer wall of the heating pipe.

13. The large-dip-angle self-leveling device according to claim 1, wherein, the melting pool is provided with a leveling limiting ring, and the leveling limiting ring is provided with a limiting connecting sheet connected with the four-core cable.

14. The large-dip-angle self-leveling device according to claim 1, wherein, the dedicated hot melt adhesive is prepared by mixing paraffin, rosin and hot melt adhesive stick according to a mass ratio of 1:1:1, and then heating to melt and uniformly stirring the paraffin, rosin and hot melt adhesive stick.

15. The large-dip-angle self-leveling device according to claim 1, wherein, a heating end of the heating pipe is inserted into the dedicated hot melt adhesive in the melting pool.

\* \* \* \* \*